Patented May 5, 1942

2,281,961

UNITED STATES PATENT OFFICE 2,281,961

PRODUCTION OF SUPERPOLYAMIDES

Hanns Ufer and August Weickmann, Ludwigshafen-on-the-Rhine, Germany, assignors, by mesne assignments, to E. I. du Pont de Nemours and Company, Wilmington, Del.

No Drawing. Application December 13, 1939, Serial No. 309,030. In Germany December 6, 1938

5 Claims. (Cl. 260—78)

The present invention relates to improvements in the production of superpolyamides.

We have found that valuable superpolyamides, i. e. high-molecular condensation products similar to polypeptides and which may be drawn into threads when heated, are obtained for example from diamines and dicarboxylic acids, it being understood that the mention herein of these reactants is intended to include their amide-forming derivatives, as for example esters or amides, or from the corresponding dicarboxylic acid salts of diamines or from omega-aminocarboxylic acids or their lactams, if small proportions of a polyhydric alcohol or an ester or ether thereof containing at least one free hydroxyl group are added to the condensation mixture.

For making superpolyamides of the above type various carboxylic acids the carbon chain of which may be interrupted by hetero atoms, such as O, N or S atoms, and various diamines may be employed. The process is of particular advantage for the preparation of superpolyamides from aliphatic $\omega.\omega'$-diamines of higher molecular weight free from side chains, such as penta- or hexamethylenediamine, and aliphatic $\omega.\omega'$-dicarboxylic acids of higher molecular weight, such as adipic acid, azelaic acid, sebacic acid, or from $\epsilon$-aminocaproic acid or their homologues.

Among suitable polyhydric alcohols there may be mentioned for example glycols, especially glycols of higher boiling point, such as di-, tri-, tetra- and pentaethyleneglycol, 1.3- and 1.4-butyleneglycol, 1.6-hexanediol or 1.4-butinediol. Esters or ethers of the said alcohols, especially their esters with the dicarboxylic acids required for the condensation may also be used. The proportions in which the said alcohols or their esters or ethers may be used may range up to 3 per cent, preferably 1 per cent or even less of the amount of the superpolyamide-forming substances employed, e. g. of the amount of the dicarboxylic acid plus diamine, or of the dicarboxylic acid salt of the diamine, or of the aminocarboxylic acid or superpolyamide-forming derivatives thereof.

The condensation products are prepared by heating the said substances preferably at temperatures ranging between 100° C. and about 300° C. Depending on the temperature as well as on the duration and method of heating superpolyamides of varying properties are obtained. Too high temperatures, such as above 300° C., should be avoided, as they cause ready decomposition and darkening in color. The process may be carried out under ordinary, increased or reduced pressure. A preferred method consists in initially using increased pressure or working under reflux-cooling thus bringing about as uniform a melting of the masses as possible, and afterwards completing the condensation under ordinary or reduced pressure while distilling off the water, alcohol, ammonia or amine, respectively, formed. Solvents or diluents may be added if desired. Among suitable solvents there may be mentioned such as allow of the separation of the water split-off by azeotropic distillation, as for example xylene or xylenol. In order to obtain products of the greatest possible paleness, air and oxygen should be excluded as far as possible.

By addition of the hydroxyl compounds to the condensation process clear, transparent, solid and well workable superpolyamides are obtained which are suitable for use in the manufacture of threads, films, strings, ribbons, tubes, coatings, coverings, moldings and as an intermediate layer in the manufacture of non-splintering glass.

The following examples serve to illustrate how the present invention may be carried out in practice, but the invention shall not be restricted to these examples. The parts are by weight.

Example 1

300 parts of the adipic acid salt of hexamethylene-diamine are well mixed with 3 parts of 1.6-hexanediol, heated to 280° C. within 90 minutes in a closed vessel of chromium nickel steel and then maintained at the said temperature for 4½ hours while distilling off the water formed. The white, tough product thus obtained may well be drawn into threads and yields films of particular clarity and transparency.

Example 2

1500 parts of the adipic acid salt of hexamethylene-diamine are mixed with 14 parts of 1.4-butanediol and heated to 280° C. within 1 hour in an open vessel provided with a reflux condenser. Then heating at about 280° C. is continued for another 6 hours without refluxing, the water formed being allowed to distil off. A colorless product is obtained which may well be worked into soft, elastic and transparent films.

Example 3

A mixture of 2000 parts of $\epsilon$-amino caproic acid lactam, 40 parts of 1.6-hexanediol and 600 parts of water is heated to a temperature of 276–278° C. in a closed vessel made of chromium-nickel-steel while the pressure is maintained for two hours at 15 atmospheres by releasing the excess of steam formed. Then the pressure is released by and by in the course of 1½ hours down to atmospheric pressure, at which the condensation is finished by continuing the heating for another 1½ hours. The molten product is then pressed through a slit at the bottom of the vessel into water by means of nitrogen free from oxygen. A practically clear condensation product is obtained, which is distinguished by excellent softness and flexibility as compared with the superpolyamide condensed without the aid of 1.6-hexanediol.

In an analogous manner mixed condensation products from the adipic acid salt of hexamethylene diamine and ε-amino-caproic acid lactam may be obtained by adding 1.6-hexanediol.

What we claim is:

1. In the production of superpolyamides the step which comprises heating at 100° to 300° C. a superpolyamide-forming composition in the presence of a small amount not exceeding 3 per cent by weight of a member selected from the group consisting of polyhydric alcohols and their esters and ethers containing at least one free hydroxyl group, said superpolyamide-forming composition containing an equal number of amino and acid groups and being selected from the class consisting of monoaminomonocarboxylic acids and mixtures of diamine and dicarboxylic acid in equimolecular proportions.

2. In the production of superpolyamides the step which comprises heating at 100° to 300° C. a superpolyamide-forming composition in the presence of a small amount not exceeding 3 per cent by weight of a glycol, said superpolyamide-forming composition containing an equal number of amino and acid groups and being selected from the class consisting of monoaminomonocarboxylic acids and mixtures of diamine and dicarboxylic acid in equimolecular proportions.

3. In the production of superpolyamides the step which comprises heating at 100° to 300° C. a superpolyamide-forming composition in the presence of a small amount not exceeding 3 per cent by weight of 1,6-hexanediol, said superpolyamide-forming composition containing an equal number of amino and acid groups and being selected from the class consisting of monoaminomonocarboxylic acids and mixtures of diamine and dicarboxylic acid in equimolecular proportions.

4. In the production of superpolyamides the step which comprises heating at 100° to 300° C. a superpolyamide-forming composition in the presence of a small amount not exceeding 3 per cent by weight of 1,4-butanediol, said superpolyamide-forming composition containing an equal number of amino and acid groups and being selected from the class consisting of monoaminomonocarboxylic acids and mixtures of diamine and dicarboxylic acid in equimolecular proportions.

5. In the production of superpolyamides the step which comprises heating at 100° to 300° C. a superpolyamide-forming composition in the presence of a small amount not exceeding 1 per cent of a member selected from the group consisting of polyhydric alcohols and their esters and ethers containing at least one free hydroxyl group, said superpolyamide-forming composition containing an equal number of amino and acid groups and being selected from the class consisting of monoaminomonocarboxylic acids and mixtures of diamine and dicarboxylic acid in equimolecular proportions.

HANNS UFER.
AUGUST WEICKMANN.